Patented May 31, 1949

2,471,803

UNITED STATES PATENT OFFICE 2,471,803

WELDROD FLUX COATING

Rene D. Wasserman, New York, N. Y.

No Drawing. Application December 22, 1945,
Serial No. 637,117

3 Claims. (Cl. 148—24)

My invention relates to flux compositions, more particularly to flux coatings for welding rods employed in electric arc welding.

The use of flux coatings upon welding rods employed in the electric arc welding of metals has become common practice. Such coated rods have many advantages over bare rods, insofar as the flux coating prevents atmospheric contamination of the molten metal, while it is at the unusually high temperatures developed during electric welding, compensates for eventual loss of alloying elements, improves and/or changes the metallurgical properties of the weld by supplying appropriate additions of ferro alloys thereto, and stabilizes the electric arc, thus perfecting the whole operation.

The flux coatings employed should possess a combination of many desirable properties, in order properly to perform their functions. These coatings should adhere firmly to the rod and melt at a predetermined temperature below that required for the welding operation. Usually such coatings contain ingredients that will form a gaseous envelope about the weld, which will serve to exclude the oxygen and nitrogen of the air. Slag forming ingredients are included, in order to dissolve and carry off undesirable oxides that may be present or be formed in the weld. Other ingredients may also be present to regulate the flow of the metal forming the weld, to act as deoxidizers, to alloy with the weld metal and to stabilize the arc. Thus the flux coating is designed to facilitate the welding operation and to improve the metallurgical properties of the weld.

While flux ingredients are known that will separately perform each of the above-mentioned functions, and mixtures of such ingredients have been produced possessing combinations of some of the desired properties, it has not been possible to prepare flux compositions displaying to a satisfactory degree all of the desired properties. This is because an ingredient imparting one desired property to the composition frequently adversely affects one or more of its other desired properties. Thus, care must be taken not to include any ingredient that will detrimentally affect the metallurgical properties of the weld, for example, cause porosity, brittleness or reduce tensile strength. Furthermore, all of the ingredients must be compatible with each other.

It is a known fact that the usual flux coating compositions frequently develop undesirable properties during their preparation and during the coating procedure. This is generally due to premature chemical reactions that may occur between the ingredients of the flux, particularly upon its exposure to the air. Gases, such as carbon dioxide, are developed within the coating compositions. The resultant bubbles render the coatings produced therewith porous and uneven, and form pin-holes upon their surfaces. Such defects cause difficulties in the welding operation.

An object of my invention is to produce flux compositions, primarily electrode coatings, that are free from the aforesaid defects and which combine to a far greater extent all of the many qualities desired for such compositions. My new flux compositions greatly facilitate the welding operation and improve the metallurgical properties of the weld. A particular object of my invention is to prevent any premature chemical reaction between the flux ingredients, that would result in the loss of beneficial properties in the welding operation. Another object is to improve the coating properties of the compositions, thus assuring the formation of compact, uniform coatings under all atmospheric conditions. Further objects will appear from the following detailed description of my new compositions.

In making up my new flux coating compositions I prepare an intimate mixture of the following dry, pulverulent ingredients:

| | Parts by weight |
|---|---|
| Carbonaceous material | 10–30 |
| Alkaline earth metal salts | 25–60 |
| Silicon | 5–20 |
| Heavy metal oxides | 2.5–25 |
| Deoxidizing ferro alloys | 3–30 |

I then form a coating composition of suitable consistency by stirring this mixture into a concentrated aqueous solution of a water-soluble silicate, which contains effective amounts of both a wetting agent and an anti-foaming agent.

In these compositions I preferably employ graphite powder as a supplier of carbon. It is the function of the carbonaceous material to act as a reducing agent, and to form oxides of carbon that become part of the gaseous envelope protecting the weld while it is being formed. I have found that graphite is far superior to coal, wood charcoal and other commonly used carbonaceous materials, because of its chemical inertness and its high thermal conductivity with low co-efficient of thermal expansion. Coal and wood charcoal tend to combine with the iron present in the weld to form iron carbides which facilitate the austenite transformation by rapid cooling of the weld, thus hardening the weld appreciably. Graphite does not have this tendency and, therefore, permits the production of relatively soft and very tough welds that can easily be machined. Consequently, I prefer to employ graphite powder as the carbonaceous material in my compositions. It should constitute at least the major proportion of the carbonaceous material present. Graphite has been used previously in some welding fluxes, but not in flux compositions employing the ingredients and proportions set forth above.

My new compositions preferably contain an unusually large proportion of relatively coarse silicon powder. The silicon is desired to promote slag coverage and fluidity of the flux during welding. However, substantial amounts of the fine silicon powder heretofore employed could not be used in my compositions, because of the very detrimental effect of the so-called "gassing" that results from the reaction, in the presence of air, between the silicon and the water-soluble silicate employed as a binder. The extent to which this reaction may occur depends mostly upon the total exposed area of the silicon particles, and the finer are the particles, the greater is the area exposed to the reaction. Another disadvantage of the fine particles is that they burn much faster during the welding operation and thus cause the loss of appreciable amounts of some of the alloying metal constituents. I prefer to use a silicon powder that will pass through an 80 mesh screen, but be retained upon a screen of 100 mesh. In this form I can employ sufficient silicon to exert the desired beneficial effect, without at the same time exerting a substantially detrimental effect.

The most important feature of my invention resides in the employment of a small quantity of both an anti-foaming agent and a wetting agent in my flux compositions. It is very difficult in practice to obtain uniform and compact coatings upon the electrodes, particularly when employing the dip method. The results of the coating procedure are greatly affected by premature chemical reaction between the ingredients. Such chemical reaction is promoted by exposure to air and by high temperatures and humidity. Air bubbles frequently are formed upon the surface of the coatings. Thus irregularities are produced in the thickness and density of the resultant coatings, which in turn cause irregularities in the welding operation necessitating the use of higher currents and higher temperatures, all to the detriment of the quality of the resultant weld.

I have found that these difficulties are substantially overcome by the addition of both an anti-foaming and a wetting agent to my flux coating compositions. While I do not wish to limit myself to any particular theory of action, it seems that the anti-foaming agent suppresses the inclusion of air within the coating composition. Apparently the wetting agent facilitates the rapid formation of a uniform coating along the length of the rod. These beneficial effects will in turn serve to minimize any premature chemical reaction and thus favor the production of denser, more adherent coatings. Whatever may be the correct explanation, there can be no doubt that the presence of small amounts of these two agents in the coating composition remarkably improves the coating procedure and the resultant coated electrodes.

Not only do the anti-foaming agent and the wetting agent improve the coating operation, as indicated above, but they also appear to have a plasticizing effect upon the final coating, rendering it less brittle and less apt to be chipped off. Another very important advantage, when using these agents, is that it becomes possible to make up the coating paste and to employ it over an extended period of time without deterioration. In the absence of these agents the paste rapidly deteriorates and must be freshly made up before being applied. This supports my conclusion that these agents in some manner tend to prevent premature chemical reaction of the flux ingredients.

Obviously the anti-foaming agent and the wetting agent must be compatible with each other and with the other ingredients of the flux composition, i. e., they should not chemically react therewith. This can easily be ascertained by a few, simple tests. I have found that 2-ethyl-hexanol is a very suitable anti-foaming agent for this purpose. Other suitable anti-foaming agents are the triamyl amines, Anti-Foam LF sold by E. I. du Pont de Nemours & Co., and Anti-Foam No. 25-2 sold by Hercules Powder Co. Many suitable wetting agents are available on the market. I may cite, as examples, Aerosol 25% sold by Carbide & Carbon Chemical Co., various Tergitols sold by the same concern, Triton W-30 sold by Rohm & Haas Chemical Co., and Intramine sold by Synthetic Chemicals Corp. Only small amounts of these agents are required. I prefer to use 0.25 to 0.75% by weight of the entire coating composition of the anti-foaming agent and 0.01 to 0.05% of the wetting agent. The optimum amounts of the various kinds of these two agents to be employed in each particular case can readily be determined.

The other ingredients of my flux compositions are more or less conventional, although the particular proportions that I employ are not. The alkaline earth metal salts, preferably the carbonates, perform the function of stabilizing the arc, assist in slag formation and in producing the protective, gaseous envelope. The heavy metal oxides are employed to assist in slag formation. The purpose of the deoxidizing ferro-alloys, such as ferro-chrome, ferro-silicon and iron-aluminum, manganese-silicon alloys, is to alloy with the metal forming the weld, thus promoting higher tensile strength and toughness. Finally, the water-soluble silicate functions as a binder and also participates in the slag formation.

When making up my flux coating compositions, I prefer to proceed as follows: First, the various dry ingredients are thoroughly mixed in powdered form. It is desirable to exercise some control of their particle size, particularly that of the silicon, as has been pointed out previously. The resultant mixture is then stirred into a concentrated aqueous solution of a water soluble silicate. I prefer to employ a solution of sodium silicate of between 30° and 32° Baumé. A sufficient amount of the latter is employed to convert the composition into a paste of the desired consistency. This will vary depending upon how thick a coating is desired, but it will usually possess a consistency comparable to that of sour cream. The paste is applied to the welding electrodes in any suitable manner, generally by dipping the electrodes therein or by extruding the paste upon the electrodes. These procedures may be repeated with intermediate drying, if necessary to build up the desired thickness of the coating. The coatings thus produced with my new coating compositions are exceptionally smooth, compact and of uniform thickness. They are free from pin holes, voids and other irregularities.

My flux coating compositions may be applied to electrodes of various metals and alloys, such as steel, nickel, Monel metal, bronze and the like, for the welding of a great variety of metals and alloys, such as cast iron, bronze, copper, tool steels and the like. The specific flux ingredients will be selected from the classes previously enumerated and the proportions thereof adjusted within the limits specified, in order to obtain optimum results for each particular application. Thus the melting point of the composition, the proportion and kind of ferro-alloy, as well as the other variable factors, should be adjusted to produce the best results for each of the metals forming the weld, and they also should be suitably varied depending upon the base metal to which the weld is applied.

The following examples illustrate certain flux compositions made up in accordance with my invention, that I have found to be particularly suited for the purposes indicated. All parts given are by weight.

Example 1

An intimate mixture of the following ingredients in dry powdered form is first prepared:

| | Pounds |
|---|---|
| Graphite | 16 |
| Barium carbonate | 51½ |
| Silicon (coarse) | 7½ |
| Manganese dioxide | 10 |
| Ferro-chrome alloy | 5 |
| Ferro-silicon alloy | 5 |
| Deoxidizing alloy | 5 |

The silicon powder employed has a particle size between 80 and 100 mesh. The deoxidizing alloy contains 40% iron, 20% aluminum, 20% manganese and 20% silicon.

A second intimate mixture is made of the following ingredients:

| | |
|---|---|
| 2-ethyl hexanol ounces | 2 |
| Aerosol 25% | 1 |
| Sodium silicate 30 degrees Baumé pounds | 80 |

The first mixture is added to the second one and the whole is thoroughly mixed to form a smooth, semi-liquid paste. This constitutes a coating composition that may be applied to nickel or Monel welding rods in the customary manner. It produces exceptionally smooth, compact and evenly distributed coatings of uniform thickness and without pin holes or other defects.

The coated electrodes thus produced will form welds upon cast iron that are outstanding as regards the flow of metal, the slag coverage of the weld, the smoothness of the deposit, the tensile strength of the weld, the stability of the electric arc and the absence of any external or internal porosity.

Example 2

An intimate mixture of the following dry, powdered ingredients is first prepared:

| | Pounds |
|---|---|
| Graphite | 20 |
| Calcium carbonate | 30 |
| Silicon (coarse) | 17½ |
| Lead oxide | 20 |
| Manganese dioxide | 2½ |
| Ferro-chrome alloy | 5 |
| Ferro-silicon alloy | 3 |
| Deoxidizing alloy | 2 |

The silicon metal powder and the deoxidizing alloy employed are identical with those used in the Example 1.

A second intimate mixture is made of the following ingredients:

| | |
|---|---|
| 2-ethyl hexanol ounces | 6 |
| Aerosol 25% | 2 |
| Sodium silicate, 30 degrees Baumé pounds | 90 |

The first mixture is added to the second one and the whole is thoroughly stirred to form a smooth, free-flowing paste. The resulting coating composition is particularly suitable for application to bronze, phosphor bronze, copper and other copper alloy welding rods that are to be employed for the welding of copper and copper alloys. Excellent non-porous welds of high quality are obtained from the rods so coated.

Example 3

An intimate mixture of the following ingredients in dry powdered form is first prepared:

| | Pounds |
|---|---|
| Graphite | 18 |
| Barium carbonate | 55 |
| Silicon (coarse) | 10 |
| Manganese dioxide | 9 |
| Ferro-chrome alloy | 5 |
| Ferro-silicon alloy | 2 |
| Deoxidizing alloy | 1 |

The silicon metal powder and the deoxidizing alloy are identical with those employed in Examples 1 and 2.

A second intimate mixture is made of the following ingredients:

| | |
|---|---|
| 2-ethyl hexanol ounces | 3 |
| Aerosol 25% | 1½ |
| Sodium silicate 30 degrees Baumé pounds | 75 |

The first mixture is added to the second one and the whole is thoroughly stirred to form a heavy paste. This constitutes a coating composition that may be applied to steel and alloy steel rods in the customary manner. Such electrodes are eminently suitable for welding on alloy steels and will form excellent, non-porous, smooth welds of perfect machinability.

It will be apparent to those skilled in the art that many variations may be made in the compositions just described without departing from the scope of my invention. Additional ingredients may be incorporated or part of the graphite replaced by some other carbonaceous material. Similarly, a part of the alkaline earth metal carbonate may be replaced by another alkaline earth metal salt, such as the fluoride. My invention is not limited to the specific details given above, but embraces all compositions and coated electrodes within the scope of the appended claims.

I claim:

1. A flux coating composition consisting of:

| | Parts by weight |
|---|---|
| Graphite | 10–30 |
| Alkaline earth metal carbonates | 25–60 |
| Silicon metal powder (80 to 120 mesh) | 5–20 |
| Heavy metal oxides selected from the group consisting of manganese dioxide and both manganese dioxide and lead oxide | 2.5–25 |
| Deoxidizing ferro alloys | 3–30 | intimately admixed with a concentrated aqueous solution of an alkali-metal silicate, containing effective amounts of both a wetting agent and an anti-foaming agent, said solution being employed in an amount sufficient to impart to the coating composition from a creamy to pasty consistency.

2. A flux coating composition as claimed in claim 1, wherein the alkali-metal silicate solution consists of an aqueous sodium silicate solution of from 30 to 32 degrees Baumé.

3. A flux coating composition as claimed in claim 1, wherein the deoxidizing ferro alloys are composed of ferro chrome, ferro-silicon and iron-manganese-aluminum-silicon alloys.

RENE D. WASSERMAN.

REFERENCES CITED

The following references are of record in the file of this patent:

UNITED STATES PATENTS

| Number | Name | Date |
|---|---|---|
| 1,650,905 | Mills | Nov. 29, 1927 |
| 1,942,299 | Lemmerman et al. | Jan. 2, 1934 |
| 2,077,397 | Christensen | Apr. 20, 1937 |
| 2,113,222 | Rochocz | Apr. 5, 1938 |
| 2,164,775 | Miller | July 4, 1939 |
| 2,169,659 | Noble | Aug. 15, 1939 |
| 2,287,411 | Boller et al. | June 23, 1942 |
| 2,303,746 | Kihlgren et al. | Dec. 1, 1942 |
| 2,323,711 | Franklin | July 6, 1943 |